US010190415B2

(12) United States Patent
Faeth et al.

(10) Patent No.: US 10,190,415 B2
(45) Date of Patent: Jan. 29, 2019

(54) TURBOCHARGER WITH A RADIAL-AXIAL TURBINE WHEEL

(71) Applicant: CONTINENTAL AUTOMOTIVE GMBH, Hannover (DE)

(72) Inventors: Holger Faeth, Fussgoenheim (DE); Marc Hiller, Morschheim (DE); Ivo Sandor, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 391 days.

(21) Appl. No.: 14/897,753

(22) PCT Filed: Apr. 29, 2014

(86) PCT No.: PCT/EP2014/058753
§ 371 (c)(1),
(2) Date: Dec. 11, 2015

(87) PCT Pub. No.: WO2014/198453
PCT Pub. Date: Dec. 18, 2014

(65) Prior Publication Data
US 2016/0186568 A1 Jun. 30, 2016

(30) Foreign Application Priority Data
Jun. 13, 2013 (DE) ........................ 10 2013 210 990

(51) Int. Cl.
*F01D 25/16* (2006.01)
*F01D 1/22* (2006.01)
(Continued)

(52) U.S. Cl.
CPC ............... *F01D 1/22* (2013.01); *F01D 9/026* (2013.01); *F01D 25/12* (2013.01); *F01D 25/16* (2013.01); *F05D 2220/40* (2013.01)

(58) Field of Classification Search
CPC . F01D 1/22; F01D 9/026; F01D 25/12; F01D 25/16; F01D 2220/40; F01D 5/28; F01D 25/007; F01D 2260/39
(Continued)

(56) References Cited

U.S. PATENT DOCUMENTS 3,734,650 A * 5/1973 Reisacher ............... F01D 9/026 415/205
4,364,717 A * 12/1982 Schippers ............ F01D 25/125 415/180
(Continued)

FOREIGN PATENT DOCUMENTS

CN 1542260 A 11/2004
CN 101245713 A 8/2008
(Continued)

*Primary Examiner* — Logan M Kraft
*Assistant Examiner* — Brian Christopher Delrue
(74) *Attorney, Agent, or Firm* — Laurence A. Greenberg; Werner H. Stemer; Ralph E. Locher

(57) ABSTRACT

A turbocharger has a shaft with a rotational axis, a radial/axial turbine wheel which is arranged in a turbine housing and which is connected to the shaft in a non-rotatable manner, and a bearing housing which adjoins the turbine housing and which contains a lateral wall facing the turbine housing. A sub-region of the lateral wall of the bearing housing forms a sub-region of the rear wall of the turbine housing. The sub-region of the bearing housing has two sub-sections, one of which runs diagonally to the rotational axis in an inflow direction of an exhaust gas flow conducted into the turbine housing and the second of which runs in a radial direction relative to the rotational axis of the shaft and parallel to the rear wall of the turbine wheel. The two sub-sections are connected to each other via an exhaust gas flow separation edge of the bearing housing.

12 Claims, 3 Drawing Sheets

(51) Int. Cl.
*F01D 9/02* (2006.01)
*F01D 25/12* (2006.01)

(58) Field of Classification Search
USPC .......................................................... 416/179
See application file for complete search history.

(56) References Cited

U.S. PATENT DOCUMENTS

| | | | | | |
|---|---|---|---|---|---|
| 4,383,799 | A * | 5/1983 | Okano | F01D 25/243 | 403/326 |
| 4,735,556 | A * | 4/1988 | Fujikake | F01D 25/145 | 165/904 |
| 5,025,629 | A * | 6/1991 | Woollenweber | F01D 17/141 | 415/160 |
| 5,605,045 | A * | 2/1997 | Halimi | F01D 5/085 | 310/52 |
| 5,758,500 | A * | 6/1998 | Sumser | F01D 17/141 | 415/158 |
| 5,857,332 | A * | 1/1999 | Johnston | F01D 25/168 | 417/407 |
| 5,943,864 | A * | 8/1999 | Sumser | F01D 17/148 | 60/602 |
| 5,961,281 | A * | 10/1999 | Ojima | F01D 11/122 | 415/173.1 |
| 6,481,205 | B2 * | 11/2002 | Fledersbacher | F01D 15/10 | 60/605.1 |
| 7,008,182 | B2 | 3/2006 | Kopp et al. | | |
| 7,946,809 | B2 | 5/2011 | Meier et al. | | |
| 8,602,655 | B2 * | 12/2013 | Tabata | F01D 5/027 | 384/490 |
| 9,051,844 | B2 * | 6/2015 | Schall | C22C 19/057 | |
| 9,359,938 | B2 * | 6/2016 | Schall | C22C 38/44 | |
| 2001/0053329 | A1 * | 12/2001 | Fledersbacher | F01D 25/166 | 417/407 |
| 2002/0040581 | A1 * | 4/2002 | Finger | F01D 15/10 | 60/607 |
| 2003/0223892 | A1 * | 12/2003 | Woollenweber | F01D 15/10 | 417/407 |
| 2004/0025504 | A1 * | 2/2004 | Perrin | F01D 17/143 | 60/602 |
| 2004/0109755 | A1 * | 6/2004 | Meier | F01D 25/08 | 415/134 |
| 2004/0197212 | A1 * | 10/2004 | Roby | F01D 25/125 | 417/407 |
| 2004/0244372 | A1 * | 12/2004 | Leavesley | F01D 17/14 | 60/602 |
| 2005/0053463 | A1 * | 3/2005 | Kopp | F01D 9/026 | 415/214.1 |
| 2005/0210875 | A1 * | 9/2005 | Larue | F16C 17/024 | 60/602 |
| 2005/0232775 | A1 * | 10/2005 | Thiele | F01D 5/025 | 416/204 R |
| 2007/0108772 | A1 * | 5/2007 | Shibui | F01D 15/10 | 290/52 |
| 2007/0172348 | A1 * | 7/2007 | Battig | F01D 17/165 | 415/160 |
| 2007/0186551 | A1 * | 8/2007 | Ante | F01D 17/06 | 60/605.1 |
| 2007/0199977 | A1 * | 8/2007 | Pollard | F16D 1/027 | 228/101 |
| 2008/0010986 | A1 | 1/2008 | Fuhrmann et al. | | |
| 2008/0075583 | A1 * | 3/2008 | Schlienger | F01D 11/00 | 415/159 |
| 2008/0104956 | A1 | 5/2008 | Delvecchio et al. | | |
| 2008/0115570 | A1 * | 5/2008 | Ante | F01D 5/025 | 73/114.77 |
| 2010/0232959 | A1 * | 9/2010 | Takei | F01D 25/166 | 415/229 |
| 2011/0038717 | A1 * | 2/2011 | Lee | F01D 25/22 | 415/170.1 |
| 2012/0003081 | A1 * | 1/2012 | Woollenweber | F01D 5/082 | 415/180 |
| 2012/0039555 | A1 * | 2/2012 | Tabata | F01D 5/027 | 384/490 |
| 2012/0251298 | A1 * | 10/2012 | Moore | F01D 17/143 | 415/157 |
| 2012/0269624 | A1 * | 10/2012 | Boening | F01D 25/168 | 415/229 |
| 2012/0328418 | A1 * | 12/2012 | Yang | F01D 25/186 | 415/170.1 |
| 2013/0039747 | A1 * | 2/2013 | Heidingsfelder | F01D 25/145 | 415/177 |
| 2014/0056698 | A1 * | 2/2014 | Hornbach | F01D 25/18 | 415/170.1 |
| 2014/0255245 | A1 * | 9/2014 | Schall | C22C 38/02 | 420/51 |
| 2015/0218949 | A1 * | 8/2015 | Higashimori | F01D 5/048 | 415/205 |

FOREIGN PATENT DOCUMENTS

| | | | |
|---|---|---|---|
| DE | 1057137 | B | 5/1959 |
| DE | 102009056632 | A1 | 6/2011 |
| DE | 102011003424 | A1 | 8/2012 |
| JP | S58178828 | A | 10/1983 |
| KR | 20090035515 | A | 4/2009 |
| WO | 2005119030 | A1 | 12/2005 |

* cited by examiner

TURBOCHARGER WITH A RADIAL-AXIAL TURBINE WHEEL

BACKGROUND OF THE INVENTION

Field of the Invention

The invention relates to an exhaust-gas turbocharger which has a radial-axial turbine wheel.

DE 10 2009 056 632 A1 has disclosed an exhaust-gas turbocharger which comprises a radial-axial turbine wheel of said type. In the case of said known exhaust-gas turbocharger, the turbine housing has a guide element which forms at least a part of the rear wall of an inclined or oblique volute.

FIG. 1 shows a sectional view of said known exhaust-gas turbocharger. In said sectional view, the inflow direction and the outflow direction of the exhaust gas are illustrated schematically and in highly simplified form by way of an arrow. The known exhaust-gas turbocharger 1 has a turbine housing 10 with a volute 16. Within the turbine housing 10, a radial-axial turbine wheel 12 is arranged on a shaft 30. The shaft 30 is mounted in a bearing housing 20. Furthermore, a guide element 24 is provided, which is a heat shield. The latter is designed so as to form a rear wall 26 or a sub-region 28 of the rear wall of the volute 16, wherein the part of the rear wall or the rear wall is inclined at an angle of inclination β in the direction of the bearing housing. That region of the guide element 24 which is formed as a rear wall 26 or as part of the rear wall of the volute 16 or of the turbine housing 10 forms a substantially seamless transition with the volute 16 or with the turbine housing 10, such that the flow guidance of the exhaust gas is impaired to the least possible extent. The guide element 24 may, in an end region 32, be pushed or mounted onto a shoulder 34 of the bearing housing. Furthermore, the known exhaust-gas turbocharger has a tongue element 14 which preferably extends as far as a point close to the inlet edge 18 of the turbine wheel 12, such that the spacing a between the tongue element 14 and the inlet edge 18 of the turbine wheel 12 is small. Through the use of the described guide element 24 as a flow-guiding component of the turbine housing, it is possible for the axial structural space of the turbine housing to be made compact. Owing to the small spacing from the tongue element 14 to the inlet edge 18 of the turbine wheel 12, and the preferably parallel or substantially parallel arrangement of tongue angle and wheel inlet edge, the efficiency of the exhaust-gas turbocharger is increased.

The heat shield 24 of the exhaust-gas turbocharger described above is generally composed of sheet metal. This has the disadvantage that, owing to pressure influences during the assembly process and additionally owing to thermal influences during the operation of the exhaust-gas turbocharger, the heat shield is subjected to deformation. Said deformation can adversely affect the inflow to the turbine wheel, and thus the thermodynamics thereof. Furthermore, said deformation can result in an undesired collision between the heat shield and the turbine wheel. Furthermore, the stated deformation leads to thermo mechanical disadvantages with regard to functionality and the service life of the exhaust-gas turbocharger. For manufacturing reasons, at that point of the heat shield which is situated closest to the back of the turbine wheel, a corner radius is formed which adversely affects the inflow to the turbine wheel and thus the thermodynamics of the exhaust-gas turbocharger, as the exhaust-gas flow does not detach or separate cleanly. Furthermore, in practice, there is an undesired flow through the cavity between the back of the turbine wheel and the heat shield, and this is likewise associated with losses. Furthermore, owing to the stated temperature-induced deformations of the heat shield that occur during operation, a relatively large wheel rear-side space must be provided. This, too, leads to an intense and unfavorable through flow of hot exhaust gas during operation.

BRIEF SUMMARY OF THE INVENTION

It is the object of the invention to specify an exhaust-gas turbocharger which is equipped with a radial-axial turbine wheel and in the case of which the abovementioned disadvantages do not arise.

Said object is achieved by means of an exhaust-gas turbocharger having the features as claimed. Advantageous embodiments and refinements of the invention are specified in the dependent patent claims.

An exhaust-gas turbocharger having the features as claimed comprises a shaft which has an axis of rotation, a radial-axial turbine wheel which is arranged in a turbine housing and which is connected rotationally conjointly to the shaft, and a bearing housing which is arranged adjacent to the turbine housing and which has a side wall facing toward the turbine housing. Here, a sub-region of that side wall of the bearing housing which faces toward the turbine housing forms a sub-region of the rear wall of the turbine housing. That sub-region of the bearing housing which forms a sub-region of the rear wall of the turbine housing has two sub-portions, of which the first sub-portion runs obliquely with respect to the axis of rotation of the shaft in the inflow direction of an exhaust-gas flow conducted into the turbine housing, and the second sub-portion runs in a radial direction with respect to the axis of rotation of the shaft and parallel to the rear wall of the turbine wheel. The two sub-portions are connected to one another via an exhaust-gas flow separation edge of the bearing housing.

An exhaust-gas turbocharger of said type requires no heat shield which could deform in an undesired manner owing to pressure influences and thermal influences during the assembly process and during the operation of the exhaust-gas turbocharger. This favors the inflow to the turbine wheel and improves the thermodynamics thereof. Furthermore, in the case of an exhaust-gas turbocharger having the features according to the invention, during the operation thereof, no undesired collisions with the turbine wheel, which is rotating at high speed, can occur. This improves the functionality of the exhaust-gas turbocharger and increases the service life thereof. Furthermore, in the case of an exhaust-gas turbocharger having the features according to the invention, the cavity between the rear wall of the turbine wheel and the adjacent sub-portion of the side wall of the bearing housing, that is to say the wheel rear-side space, can be kept small, such that, in said region, too, an occurrence of an undesired through flow with the exhaust-gas flow can be at least greatly reduced.

Further advantageous characteristics of the invention will emerge from the following exemplary explanation thereof on the basis of FIGS. 2-4.

DESCRIPTION OF THE INVENTION

Figure 1:
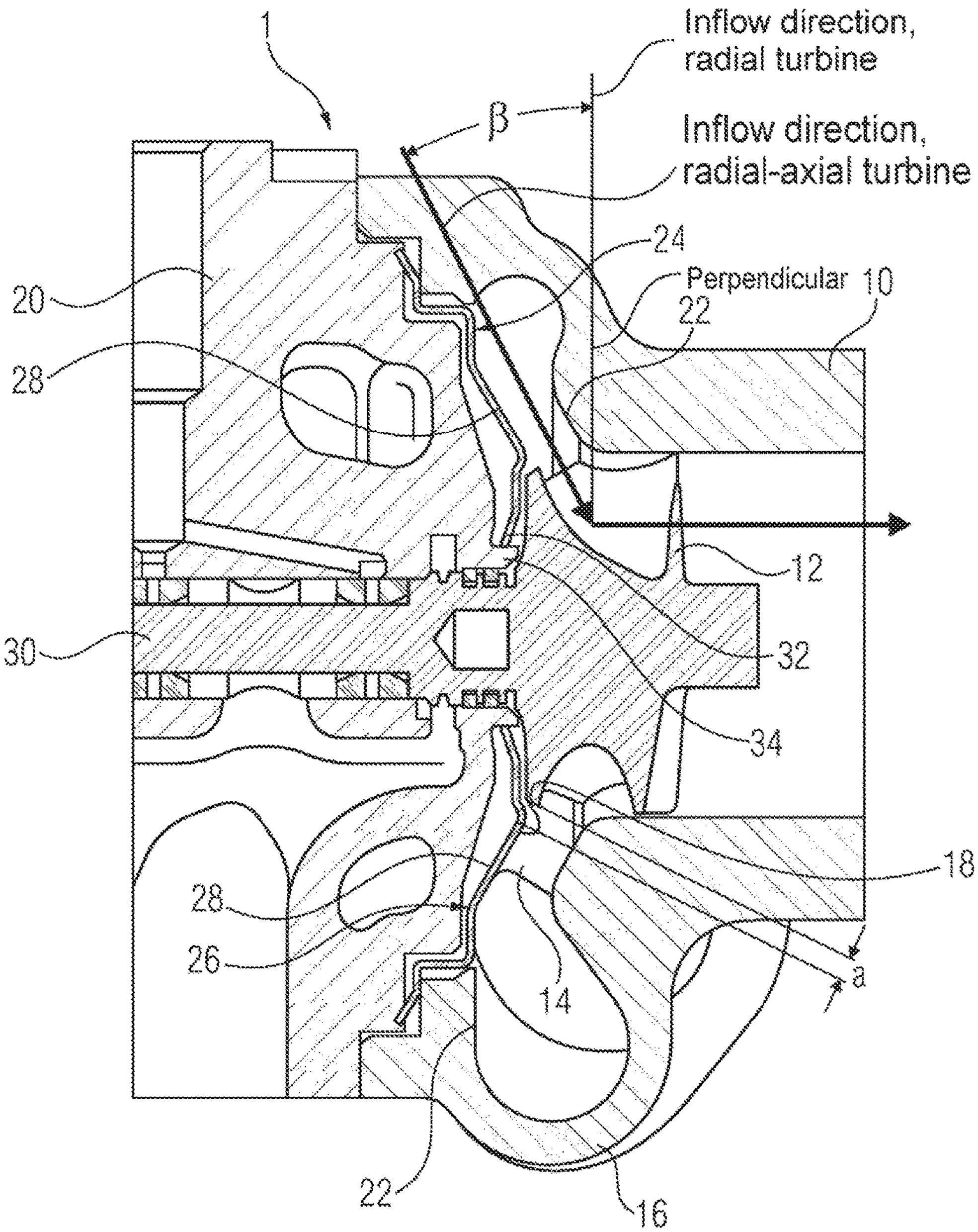
Prior art FIG 1
FIG. 1 is a sectional view of a prior art exhaust-gas turbocharger
Figure 2:
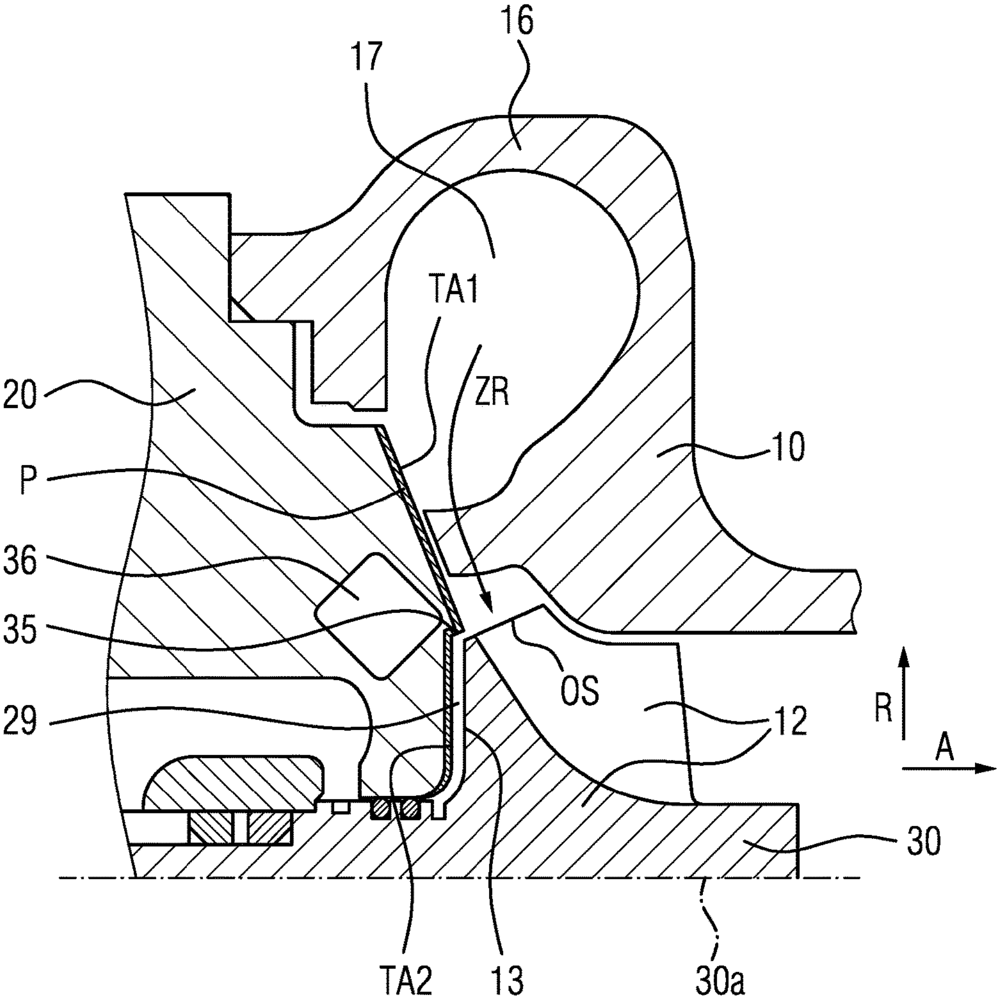
FIG. 2 shows a sectional view of a part of an exhaust-gas turbocharger according to an exemplary embodiment of the invention.

FIG. 2 shows a sectional view of a part of an exhaust-gas turbocharger according to an exemplary embodiment of the invention. Said exhaust-gas turbocharger has a turbine housing 10 with a volute 16 which surrounds an inflow region 17 for the exhaust-gas flow. Within the turbine housing 10, on a shaft 30, there is arranged a radial-axial turbine wheel 12 which is connected rotationally conjointly to the shaft. The shaft 30 is mounted in a bearing housing 20 which is adjacent to the turbine housing 10. The bearing housing 20 has a side wall facing toward the turbine housing 10. The turbine wheel 12 has a rear wall 13 and a top side OS.

A sub-region of the side wall of the bearing housing forms two sub-portions TA1 and TA2. The first sub-portion TA1 runs obliquely with respect to the axis of rotation 30 a of the shaft 30 in the inflow direction ZR of the hot exhaust-gas flow conducted into the turbine housing. The second sub-portion TA2 runs in a radial direction R with respect to the axis of rotation 30 a of the shaft 30 and also parallel to the rear wall 13 of the turbine wheel 12. The two sub-portions TA1 and TA2 are connected to one another via an exhaust-gas flow separation edge 35 of the bearing housing 20. The wheel rear-side space 29 is situated between the rear wall 13 of the turbine wheel 12 and the second sub-portion TA2, which runs parallel to said rear wall.

Within the bearing housing 20 there is arranged a water core 36 which is adjacent to the exhaust-gas flow separation edge 35. This advantageously has the effect that, during the operation of the exhaust-gas turbocharger, the region of the exhaust-gas flow separation edge 35 is cooled by a water flow that is conducted through the water core 36.

Furthermore, that side wall of the bearing housing which faces toward the turbine housing is lined with a protective layer in the region of the first sub-portion TA1 and of the second sub-portion TA2. Said protective layer is preferably composed of a material, for example nickel, which is resistant to high temperatures, to oxidation and to corrosion. Owing to said protective layer, the stated sub-portions TA1 and TA2, and in particular also the exhaust-gas flow separation edge 35, which connects the two sub-portions, of the bearing housing are protected against the high temperatures that prevail in said regions during the operation of the exhaust-gas turbocharger, such that the likelihood of deformation of said regions is reduced.

The axial direction A of the axis of rotation 30*a* of the shaft 30 and the radial direction R of the axis of rotation 30*a* of the shaft 30 are also depicted in FIG. 2.

The exhaust-gas flow separation edge 35 provided on the bearing housing 20 is designed so as to withstand the high loads that occur during the operation of the exhaust-gas turbocharger, and such that the turbulence of the supplied hot exhaust-gas flow that arises in the region of said exhaust-gas flow separation edge is kept low, such that the hydrodynamic efficiency of the exhaust-gas turbocharger can be increased. This will be discussed in more detail below on the basis of FIGS. 3 and 4.

Figure 3:
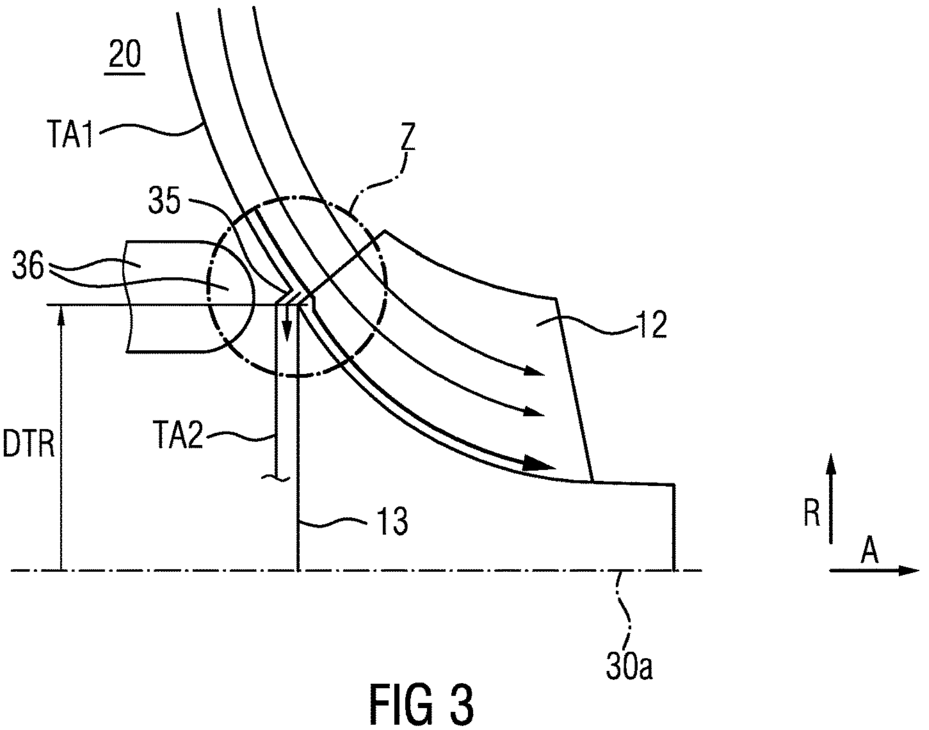
FIG. 3 shows a sketch illustrating the inflow of the exhaust-gas flow to the turbine wheel.

FIG. 3 shows a sketch illustrating the inflow of the hot exhaust-gas flow to the turbine wheel of the exhaust-gas turbocharger. In the illustrated exemplary embodiment, the hot exhaust-gas flow enters the nozzle formed between the side wall of the bearing housing 20 and the turbine housing (not shown), and is supplied along the sub-portion TA1 to the turbine wheel 12 or to the guide blades thereof. In this way, the turbine wheel together with the shaft 30 is set in rotation, wherein said rotation takes place about the axis of rotation 30*a*. Between the first sub-portion TA1 and the second sub-portion TA2, the bearing housing 20 has an exhaust-gas flow separation edge 35.

Said exhaust-gas flow separation edge 35, and the turbine wheel 12 adjacent thereto, are designed, and arranged relative to one another, such that the turbulence of the exhaust-gas flow that arises in the region of the exhaust-gas flow separation edge 35 is kept low, and such that the exhaust-gas flow separation edge 35 withstands the loads that occur during the operation of the exhaust-gas turbocharger. This is also contributed to by the water core 36 which is positioned in the vicinity of the exhaust-gas flow separation edge 35 and through which cooling water is conducted during the operation of the exhaust-gas turbocharger, which cooling water cools the region of the exhaust-gas flow separation edge 35.

Figure 4:
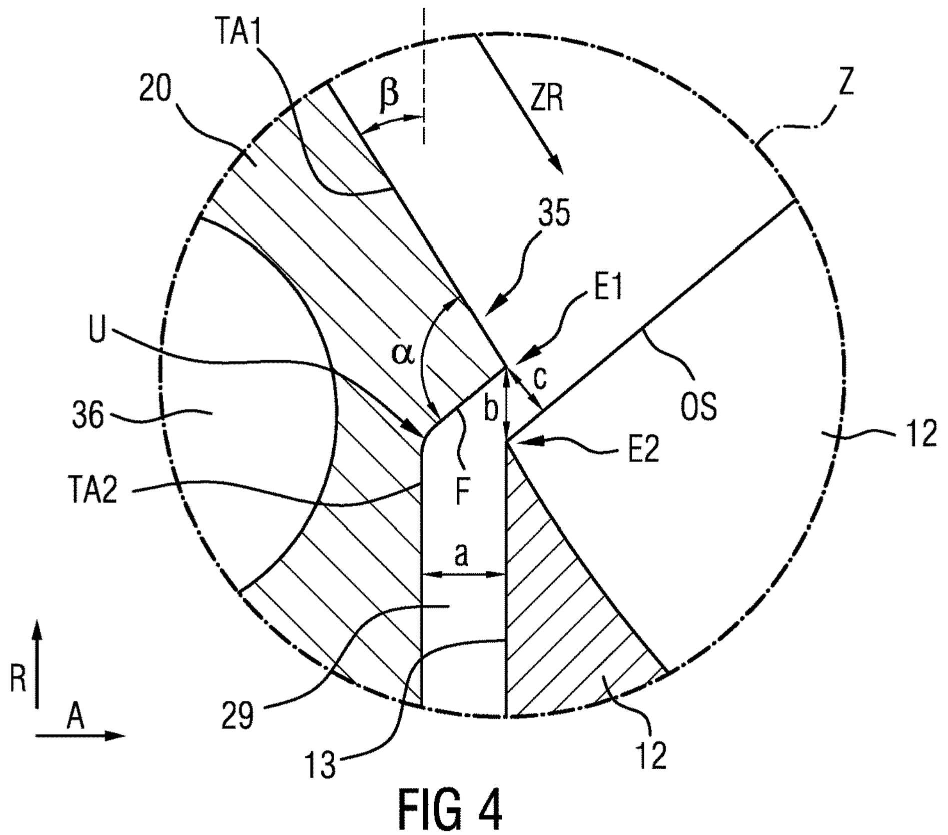
FIG. 4 is an enlarged illustration of the detail Z from FIG. 3.

The sub-region Z highlighted in FIG. 3, which contains the exhaust-gas flow separation edge 35 and the constituent parts of the turbine wheel 12 adjacent to said exhaust-gas flow separation edge, is illustrated on an enlarged scale in FIG. 4.

It can be seen from FIG. 4 that the turbine wheel 12 has, at the upper end of its rear wall 13 as viewed in the radial direction, a corner E2 from which the top side OS of the turbine wheel, or the top side of the blades thereof, runs obliquely upward. The corner E2 of the rear wall 13 of the turbine wheel 12 has a spacing b in the radial direction to a corner E1 of the exhaust-gas flow separation edge 35 of the bearing housing 20, the latter corner E1 being arranged above the former corner E2 in the radial direction. The top side OS of the turbine wheel 12 has a spacing c to the corner E1 of the exhaust-gas flow separation edge 35 of the bearing housing in the inflow direction ZR of the exhaust-gas flow. The rear wall 13 of the turbine wheel 12 has a spacing a to the second sub-portion TA2, which runs parallel to said rear wall. The first sub-portion TA1 of the bearing housing 20 likewise runs in the inflow direction ZR of the exhaust-gas flow, has an angle $\beta$ relative to the radial direction R, and ends at the corner E1 of the exhaust-gas flow separation edge 35 of the bearing housing.

Between the corner E1 of the exhaust-gas flow separation edge 35 and the second sub-portion TA2, there is provided a flank F which proceeds from the corner E1 and which is connected to the second sub-portion TA2 via a transition region U of curved form. The flank F runs parallel to the top side OS of the turbine wheel 12. The first sub-portion TA1 and the flank F enclose a corner angle $\alpha$ at the corner E1 of the exhaust-gas flow separation edge 35.

The water core 36, through which cooling water flows during the operation of the exhaust-gas turbocharger, extends into the direct vicinity of the exhaust-gas flow separation edge 35, such that the latter is cooled by the cooling water during operation, and cannot be destroyed as a result of overheating.

To prevent overheating of the exhaust-gas flow separation edge 35, it is furthermore the case that that side wall of the bearing housing 20 which faces toward the turbine housing 10 is provided with a protective layer in the region of the first sub-portion TA1, of the second sub-portion TA2 and of the flank F. Said protective layer is preferably composed of a material, for example nickel, which is resistant to high temperatures, oxidation and to corrosion.

The spacing b in the radial direction between the corner E1 of the exhaust-gas flow separation edge 35 and the corner E2 of the upper end region of the rear wall 13 of the turbine wheel 12 is in a defined ratio with respect to the diameter DTR, measured in the radial direction R, of the rear wall 13 of the turbine wheel 12. The following relationship preferably applies:

$$0.005 \leq b/DTR \leq 0.025.$$

The spacing a between the rear wall 13 of the turbine wheel 12 and the second sub-portion TA2 is likewise in a defined ratio with respect to the diameter DTR, measured in the radial direction, of the rear wall 13 of the turbine wheel 12. In this case, too, the following relationship preferably applies:

$$0.005 \leq a/DTR \leq 0.025.$$

Altogether, the invention provides an exhaust-gas turbocharger which is equipped with an axial-radial turbine wheel and in the case of which the exhaust-gas flow in the turbine housing is guided to the turbine wheel through a nozzle, without the use of a separate guiding element. One side wall of said nozzle is formed by a first sub-portion of that side wall of the bearing housing which faces toward the turbine housing, said first sub-portion running in the inflow direction of the exhaust-gas flow. The other side wall of the nozzle is formed by a wall of the turbine housing. The first sub-portion TA1 of that side wall of the bearing housing which faces toward the turbine housing is connected, via an exhaust-gas flow separation edge 35, to a second sub-portion TA2, which runs parallel to the rear wall of the turbine wheel.

Such a design of that side wall of the bearing housing which faces toward the turbine housing creates the conditions necessary for the exhaust-gas flow separation edge of the bearing housing to withstand the high loads that arise during the operation of the exhaust-gas turbocharger, such that the thermodynamic efficiency of the exhaust-gas turbocharger can be increased. If one or more of the features specified in the dependent claims are used in addition to this embodiment of that side wall of the bearing housing which faces toward the turbine housing, then the functionality of the exhaust-gas turbocharger during operation is further enhanced. This is contributed to in particular by the shaping of the bearing housing in the region of the exhaust-gas flow separation edge, the positioning of the water core, the use of a protective layer, and the dimensioning of the above-described spacings a and b.

Tests have shown that the functionality of an exhaust-gas turbocharger according to the invention during operation is realized even in the presence of high exhaust-gas inlet temperatures of greater than 1050° C.

The invention claimed is:

1. An exhaust-gas turbocharger, comprising:

a shaft having an axis of rotation;

a turbine housing;

a radial-axial turbine wheel disposed in said turbine housing and connected rotationally conjointly to said shaft, said radial-axial turbine wheel having a rear wall; and a bearing housing adjacent said turbine housing and having a side wall facing toward said turbine housing, said side wall of said bearing housing having a first sub-portion, a second sub-portion, and a flank;

said first sub-portion running obliquely with respect to the axis of rotation of said shaft, said first sub-portion for guiding exhaust gasses toward said radial-axial turbine wheel;

said second sub-portion running in a radial direction with respect to the axis of rotation of said shaft and parallel to said rear wall of said radial-axial turbine wheel;

said first and second sub-portions being connected to one another via an exhaust-gas flow separation edge of said bearing housing;

said exhaust-gas flow separation edge including a corner connected to said second sub-portion via said flank, said corner having a corner angle enclosed by said first sub-portion and said flank; and said flank extending away from said first sub-portion in a direction towards said shaft;

wherein a curved transition region is formed between said second sub-portion and said flank; and wherein said rear wall of said turbine wheel has, in an upper end region thereof, a corner formed at a first spacing distance from said corner of said exhaust-gas flow separation edge in a radially inward direction.

2. The exhaust-gas turbocharger according to claim 1, wherein said first sub-portion ends at said corner.

3. The exhaust-gas turbocharger according to claim 2, wherein said first sub-portion is rectilinear in section.

4. The exhaust-gas turbocharger according to claim 2, wherein said first sub-portion is curved in section.

5. The exhaust-gas turbocharger according to claim 1, wherein a top side of said turbine wheel has a second spacing to said corner of said exhaust-gas flow separation edge inwardly in an inflow direction of the exhaust-gas flow.

6. The exhaust-gas turbocharger according to claim 5, wherein said flank runs parallel to the top side of said turbine wheel.

7. The exhaust-gas turbocharger according to claim 5, wherein a ratio of said second spacing to a diameter of said rear wall of said turbine wheel lies in the range between 0.005 and 0.025.

8. The exhaust-gas turbocharger according to claim 1, wherein said rear wall of said turbine wheel is disposed at a third spacing distance from said second sub-portion.

9. The exhaust-gas turbocharger according to claim 8, wherein a ratio of said third spacing to a diameter of said rear wall of said turbine wheel lies in a range between 0.005 and 0.025.

10. The exhaust-gas turbocharger according to claim 1, wherein said bearing housing has a water core adjacent said exhaust-gas flow separation edge.

11. The exhaust-gas turbocharger according to claim 1, wherein said side wall of said bearing housing which faces toward said turbine housing carries a protective layer in a region of said first sub-portion, of said second sub-portion and of said flank.

12. The exhaust-gas turbocharger according to claim 11, wherein said protective layer is composed of a material that is resistant to elevated temperatures, to oxidation and to corrosion.

* * * * *